United States Patent
Hyatt et al.

(10) Patent No.: US 10,049,304 B2
(45) Date of Patent: Aug. 14, 2018

(54) METHOD AND SYSTEM FOR DETECTING AN OCCUPANT IN AN IMAGE

(71) Applicant: POINTGRAB LTD., Hod Hasharon (IL)

(72) Inventors: Yonatan Hyatt, Tel-Aviv (IL); Benjamin Neeman, Raanana (IL); Jonathan Laserson, Tel-Aviv (IL)

(73) Assignee: POINTGRAB LTD., Hod Hasharon (IL)

( * ) Notice: Subject to any disclaimer, the term of this patent is extended or adjusted under 35 U.S.C. 154(b) by 0 days.

(21) Appl. No.: 15/402,370

(22) Filed: Jan. 10, 2017

(65) Prior Publication Data

US 2018/0039862 A1 Feb. 8, 2018

(30) Foreign Application Priority Data

Aug. 3, 2016 (IL) .......................................... 247101

(51) Int. Cl.

| | |
|---|---|
| *G06K 9/00* | (2006.01) |
| *G06K 9/62* | (2006.01) |
| *G06K 9/66* | (2006.01) |
| *G06K 9/52* | (2006.01) |
| *G06T 7/73* | (2017.01) |
| *G06K 9/78* | (2006.01) |
| *G06K 9/46* | (2006.01) |

(52) U.S. Cl.
CPC ....... *G06K 9/6267* (2013.01); *G06K 9/00335* (2013.01); *G06K 9/52* (2013.01); *G06K 9/66* (2013.01); *G06K 9/78* (2013.01); *G06T 7/73* (2017.01); *G06K 9/00771* (2013.01); *G06K 2009/4666* (2013.01)

(58) Field of Classification Search
USPC ........... 345/156; 348/36, 143; 382/103, 107; 386/241
See application file for complete search history.

(56) References Cited

U.S. PATENT DOCUMENTS

| | | | |
|---|---|---|---|
| 6,678,413 B1 | 1/2004 | Liang | |
| 8,723,959 B2* | 5/2014 | Corcoran | .............. G06T 3/0062 348/143 |
| 8,798,130 B2* | 8/2014 | Yoshino | ................ G06T 7/0026 375/240 |

(Continued)

OTHER PUBLICATIONS

Nait-Charif, Hammadi, "Activity Summarisation and Fall Detection in a Supportive Home Environment", Pattern Recognition, 2004. ICPR 2004. Proceedings of the 17th International Conference on, vol. 4, pp. 323-326. IEEE, 2004. Harvard.

(Continued)

*Primary Examiner* — Xuemei Chen
(74) *Attorney, Agent, or Firm* — Alphapatent Associates, Ltd; Daniel J. Swirsky (57) ABSTRACT

A method and system for detecting occupancy in a space use computer vision techniques. In one embodiment an object is detected in an image of the space. If the object is detected in a first area of the image, a shape of the object is determined based on a first shape feature of the object and if the object is detected in a second area of the image, the shape of the object is determined based on a second shape feature of the object. The object may be determined to be an occupant based on the determined shape of the object.

19 Claims, 7 Drawing Sheets

(56) References Cited

U.S. PATENT DOCUMENTS

| | | | |
|---|---|---|---|
| 8,982,180 B2* | 3/2015 | Corcoran | G06T 3/0062 348/36 |
| 9,256,781 B2* | 2/2016 | Perski | G06K 9/00355 |
| 9,436,872 B2* | 9/2016 | Tang | G06K 9/00389 |
| 2001/0031070 A1* | 10/2001 | Wei | H04N 19/527 382/107 |
| 2012/0062749 A1* | 3/2012 | Kawahata | G06K 9/00201 348/152 |
| 2012/0274782 A1* | 11/2012 | Kitaguchi | G06K 9/00624 348/169 |
| 2013/0137929 A1* | 5/2013 | Morita | A61B 1/00009 600/167 |
| 2013/0194403 A1* | 8/2013 | Higuchi | H04N 5/23251 348/65 |
| 2014/0072170 A1 | 3/2014 | Zhang | |
| 2014/0193034 A1* | 7/2014 | Oami | G06K 9/00362 382/103 |
| 2015/0220159 A1* | 8/2015 | Hyatt | G06F 3/017 345/156 |
| 2015/0312481 A1* | 10/2015 | Gritti | H04N 5/23238 348/36 |
| 2016/0012855 A1* | 1/2016 | Krishnan | G11B 27/105 386/241 |
| 2016/0110602 A1* | 4/2016 | Chujo | G06K 9/00778 382/103 |
| 2016/0162039 A1* | 6/2016 | Eilat | G06F 3/011 382/103 |
| 2016/0180175 A1* | 6/2016 | Bitton | G06K 9/00771 348/143 |

OTHER PUBLICATIONS

Hoiem, "Putting Objects in Perspective", International Journal of Computer Vision vol. 80 p. 3-15, Apr. 17, 2008.

\* cited by examiner

METHOD AND SYSTEM FOR DETECTING AN OCCUPANT IN AN IMAGE

FIELD

The present invention relates to the field of occupancy detection using computer vision techniques.

BACKGROUND

Computer vision is sometimes used to analyze an imaged space and to detect occupants in the space.

There exist systems that use one or more cameras to monitor a space or area. Some of these systems use cameras located in a ceiling of a monitored area providing overhead tracking of occupants. However, in the case of overhead tracking the shapes of people's bodies are highly deformable and thus not easily understood by current image analysis techniques. Consequently, these systems do not accurately construe and analyze an imaged scene.

SUMMARY

Embodiments of the invention provide a method and system for detecting an occupant in an image even if there is some perspective distortion of the occupant in the image or if only part of the occupant can be sampled, due, for example, to the camera's field of view. Thereby, embodiments of the invention provide accurate analysis of an imaged scene and efficient detection of an occupant in the imaged scene.

In one embodiment a location of an object in an image of a space is determined. A shape feature which is dependent on the location of the object in the image, is then used to determine the shape of the object. Occupancy may be determined based on the shape of the object.

Thus, in one embodiment, if an object is detected in a first area of the image, the shape of the object is determined based on a first shape feature of the object and if the object is detected in a second, different area of the image, the shape of the object is determined based on a second, different shape feature of the object. The object may be determined to be an occupant based on the shape of the object.

BRIEF DESCRIPTION OF THE DRAWINGS

The invention will now be described in relation to certain examples and embodiments with reference to the following illustrative drawing figures so that it may be more fully understood. In the drawings.

DETAILED DESCRIPTION

Embodiments of the invention provide methods and systems for analysis of an imaged scene and for efficient determination of occupancy using computer vision techniques. "Determining occupancy" or "detecting occupancy" may include detecting an occupant and/or monitoring one or more occupants throughout the space e.g., counting occupants, tracking occupants, determining occupants' location in a space, etc.

"Occupant" may refer to any type of body in a space, such as a human and/or animal and/or inanimate object.

In some embodiments of the invention an occupant is detected in an image based on the shape of the occupant. In some embodiments the shape of the occupant is determined by using different shape features of the occupant, based on or dependent on the location of the occupant in the image.

Shape features typically include an image feature that discriminates between an object (e.g., an occupant) and anything in the image that is not the object.

Based on determination of the shape of the occupant a signal may be generated. The signal may be used to indicate occupancy in the space, a number of occupants, a body position of the occupant, and more.

Figure 1:
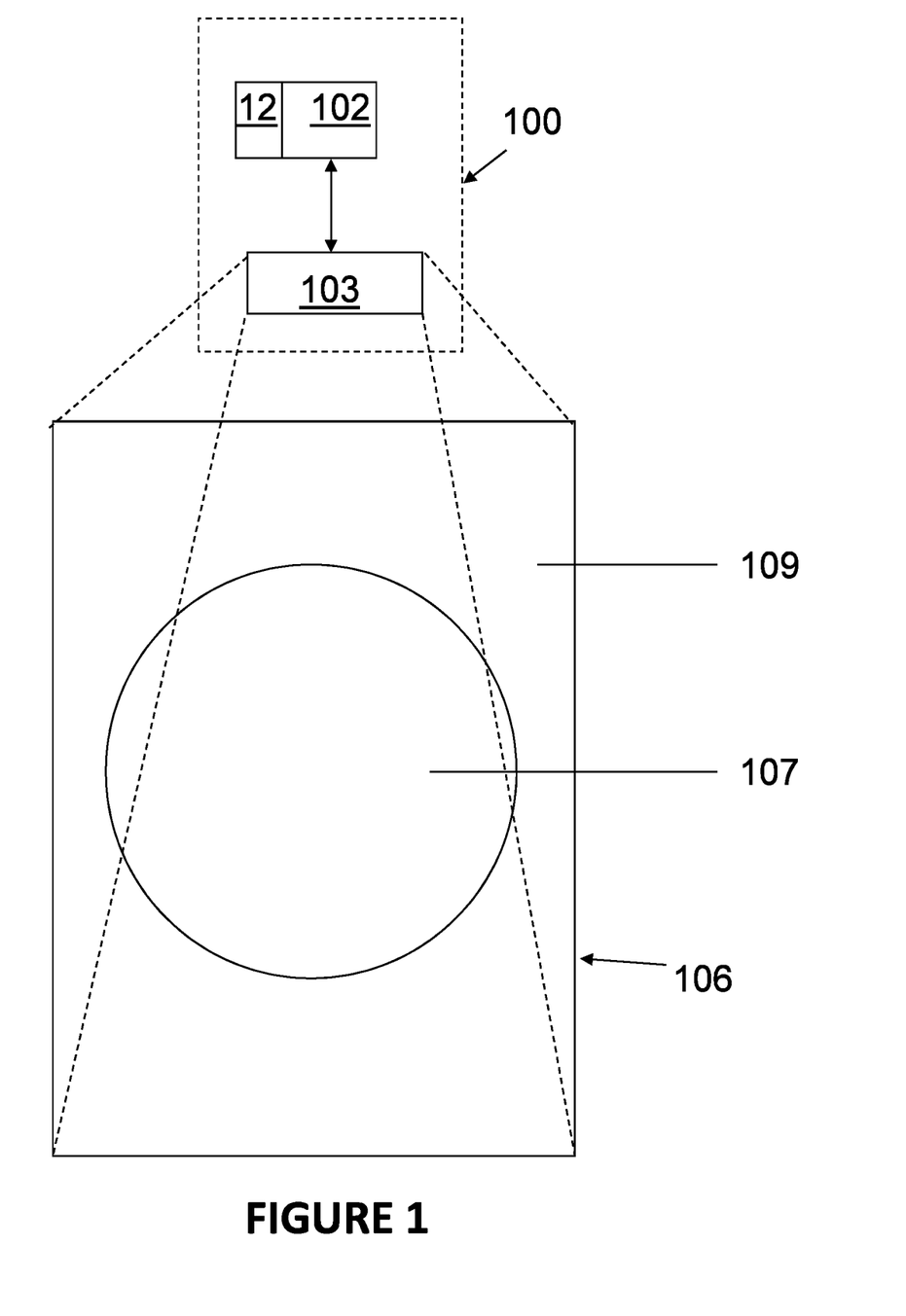
FIG. 1 is a schematic illustration of a system operable according to embodiments of the invention.

An example of a system operable according to embodiments of the invention is schematically illustrated in FIG. 1.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," "detecting", "identifying" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

In one embodiment a system 100 includes an image sensor 103 which may be part of a camera monitoring a space such as a room, a portion of a room, a hall or portion of a hall or other indoor or outdoor space.

In one embodiment a shape of an object (e.g., occupant) is detected from a 2D image. In one embodiment the camera is a 2D camera. In some embodiments the image sensor 103 is configured to obtain 2D top view images of the space. For example, image sensor 103 may be part of a ceiling mounted 2D camera which obtains image 106.

Top view images may suffer from perspective distortion and objects in the image may be distorted differently due to the different distance and/or direction of the objects from the image sensor. Determining a shape of an object in a top view image based on different locations of the object in the image, as in embodiments of the invention, enables better accuracy of detection since the object's shape can be determined based on its current perspective.

The image sensor 103 may be associated with a processor 102 and a memory 12. In one embodiment processor 102 is embedded within image sensor 103 and methods according to embodiments of the invention are run on the embedded processor. Processor 102 runs algorithms and processes to analyze an imaged scene, e.g., to detect an object (e.g., occupant) in an image obtained from image sensor 103 and/or to determine a location of the object in the image. Different shape detection algorithms (including machine learning processes) may be used to determine a shape of the object (e.g., person or part of a person) in the images, based on the location of the object in the image. Thus, in one embodiment processor 102 detects an object which is a possible occupant and then determines that the possible occupant is a verified occupant based on the shape of the object and based on the location of the object in the image.

The processor 102 may output data or signals which may be used to provide information and/or for controlling devices, which may be remote or integral to the system, for example, an electronic device such as an alarm or a lighting or HVAC (heating, ventilating, and air conditioning) device or other environment comfort devices. The device may be controlled, such as activated or modulated, by the signal output according to embodiments of the invention.

The processor 102 may be in wired or wireless communication with devices and other processors. For example, output from processor 102 may trigger a process within the processor 102 or may be transmitted to another processor or device to activate a process at the other processor or device.

In some embodiments a counter, which may be part of processor 102 or may be part of another processor that accepts input from processor 102, is used to count occupants in the space.

Processor 102 which may be an embedded processor, may include, for example, one or more processors and may be a central processing unit (CPU), a digital signal processor (DSP), a microprocessor, a mobile processor, a controller, a chip, a microchip, an integrated circuit (IC), or any other suitable processor or controller.

Memory unit(s) 12 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Images obtained by the image sensor 103 may be analyzed by a processor, e.g., processor 102. For example, image/video signal processing algorithms and/or shape detection and/or motion detection algorithms and/or machine learning processes may be run by processor 102 or by another processor.

According to some embodiments images may be stored in memory 12. Processor 102 can apply image analysis algorithms, such as known motion detection and shape detection algorithms and/or machine learning processes in combination with methods according to embodiments of the invention to analyze an imaged scene, e.g., to detect an object (such as an occupant) in an image, to determine the location of the object in the image and to determine the shape of an object from the image, dependent on the location of the object in the image.

In one embodiment if an object (e.g., an occupant) is detected in a first area of image 106, for example, a center part 107 of the image, the shape of the object is determined based on a first shape feature of the object and if the object is detected in a second area of the image 106, for example, a periphery part 109 of the image, the shape of the object is determined based on a second shape feature of the object.

In some embodiments an output is generated by processor 102 or by another processor based on the determined shape of the object. The output may include information (e.g., information regarding the shape of the object, number of objects, locations of objects, etc.) and/or may be used to control a device, such as to control another processor or controller or an alarm or other electronic device.

Typically, the image sensor 103 or camera is at a known distance from and in parallel to a surface such as the floor on which objects (e.g., occupants) are located. In some embodiments detecting an occupant (namely, determining that an object in an image is a possible occupant) is based on the distance of the image sensor obtaining the image from the imaged objects, e.g., the known distance of image sensor 103 from a surface on which the object is located (e.g., the floor of the monitored room). For example, the size or shape of an object, which may be effected by the distance of the object from the camera, may be used in detecting an object that is a possible occupant.

In some embodiments the different areas of the image (e.g., center part 107 of the image and/or periphery part 109 of the image) are calculated as a function of the image dimensions and/or as a function of the field of view of the camera obtaining the image.

In some embodiments the shape of the different areas of the image (which may be for example, circles, ellipses, squares, etc.) and/or the size of the different areas may be dependent on parameters related to the camera being used. Such parameters may include the shape or dimensions of the image being obtained and/or the distance of the image sensor from the imaged objects and/or the optics of the camera lens, etc.

In some embodiments the number of different areas of the image may be dependent on parameters related to the camera, e.g., as described above.

The different areas of the image may be the same or different size and/or shape.

In one embodiment the different areas are calculated by processor 102, e.g., based on known parameters of the image or of the camera. For example, center part 107 may be a circular shaped area having a radius that is proportional to the height of the image frame (e.g., 70% of the height of that image frame). Periphery part 109 may include the rest of the frame.

Processor 102 may run shape detection/recognition algorithms to detect the shape of objects in images. For example, shape detection/recognition algorithms may include an algorithm which calculates shape features in a Viola-Jones object detection framework. Thus, in one embodiment of the invention if the object is detected in a first area then a first set of shape features are calculated and if the object is detected in a second area, a second set of shape features are calculated.

In another example, the processor 102 may run a machine learning process to detect the shapes of objects in images. For example, a machine learning process may run a set of algorithms that use multiple processing layers (also referred to as a network) on an image to identify desired image features (image features may include any information obtainable from an image, e.g., the existence of objects or parts of objects, their location, their type and more). Each processing layer receives typically weighted input from the layer below and produces output (e.g., by calculating the weighted input) that is given to the layer above, until the highest layer produces the desired image features. Based on identification of the desired image features a shape of an occupant or other object may be determined enabling the system to detect a shape of an occupant or other object.

Typically, machine learning processes include a training stage (usually off-line) using pre-marked true and false learning examples. For example, an image or part of an image which includes an occupant (or part of an occupant)

can be used as a true learning example and an image or part of an image which does not include an occupant can be used as a false learning example.

Thus, in one embodiment of the invention if the object is detected in a first area then a first network is used to determine a shape of the object and if the object is detected in a second area, a second, different, network is used to determine the shape of the object. The term "network" as used herein includes one or more features of the machine learning process, e.g., the processing layers and/or weights and/or the full architecture including the processing layers, their connections and weights and/or other parameters.

In one embodiment, a method for detecting an occupant in an image includes determining a location of an object in an image of a space and determining a shape of the object based on a shape feature of the object, the shape feature being dependent on the location of the object in the image. A signal or output may be generated based on the determined shape of the object.

Figure 2A:
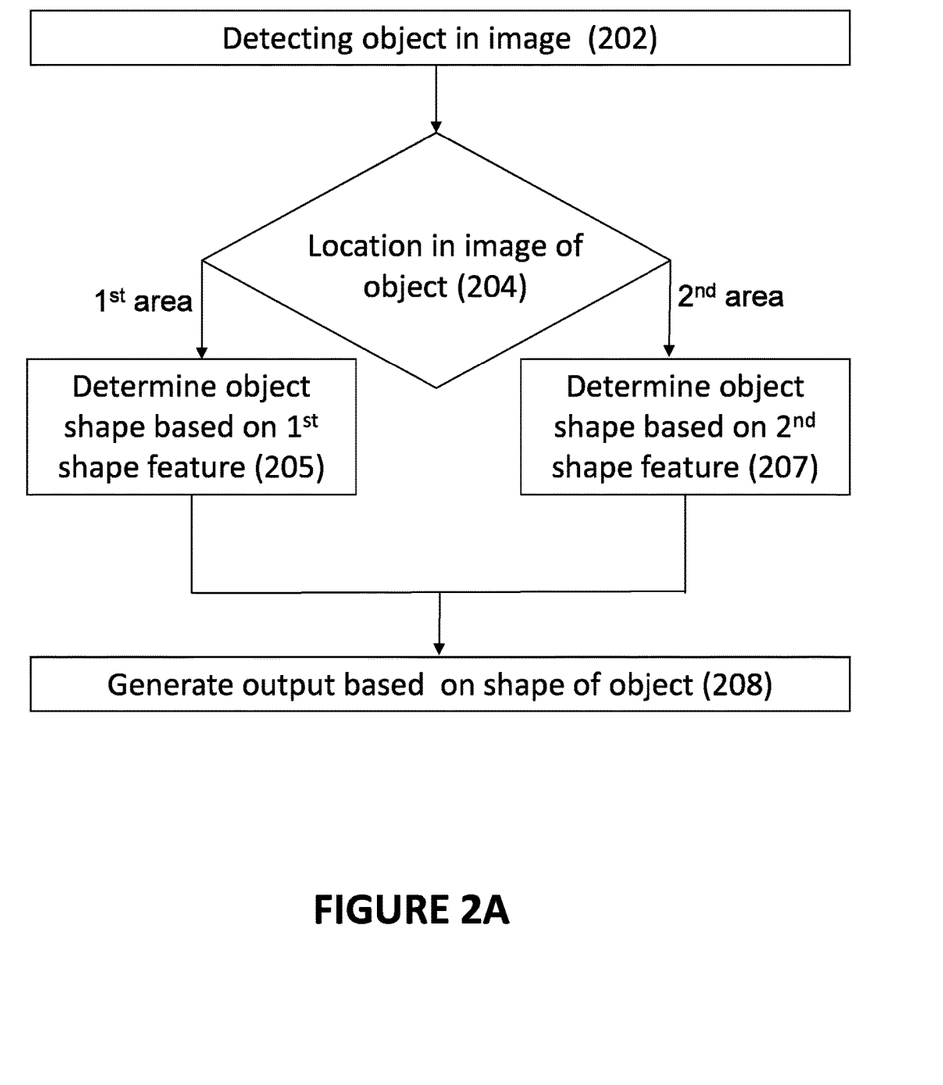
FIGS. 2A and 2B are schematic illustrations of methods for detecting an occupant in an image, according to embodiments of the invention.

In an example of this embodiment, which is schematically illustrated in FIG. 2A, a method for detecting an occupant in an image includes detecting an object in an image of the space (202). A shape feature is used to determine the shape of the object, the shape feature being dependent on the location of the object in the image (204). Thus, if the object is detected in a first area of the image, a shape of the object is determined based on a first shape feature of the object (205). If the object is detected in a second area of the image, the shape of the object is determined based on a second, different, shape feature of the object (207). An output is generated (208) based on the determined shape of the object.

Shape features typically include an image feature that discriminates between the object and anything in the image that is not the object. For example, shape features may include image features that discriminate between true and false images (e.g., images that include an occupant or part of an occupant vs. images that do not include an occupant).

Figure 2B:
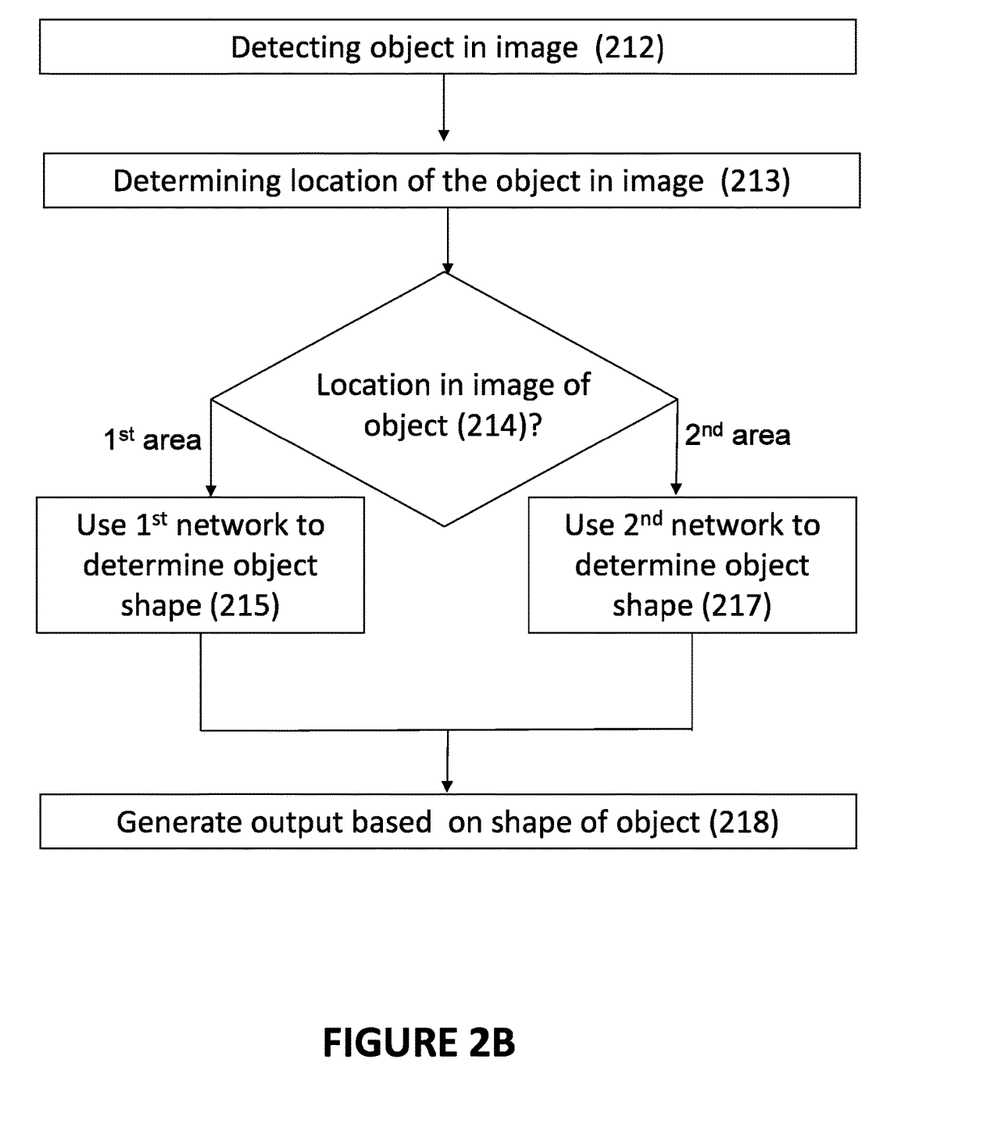

In some embodiments machine learning techniques are used to determine the shape of the object. In one example, which is schematically illustrated in FIG. 2B, two different networks are trained; a first network is trained with learning examples of occupants located within the first area of the image, and a second network is trained with learning examples of occupants located within the second area of the image. In this example a method for detecting an occupant in an image includes detecting an object in an image of the space (212). Location of the object in the image may be determined (213). If the location of the object is within a first area of the image (214) the first network is used to determine the shape of the object (215). If the location of the object is within the second area of the image (214) the second network is used to determine the shape of the object (217). An output may be generated (218) based on the determined shape of the object.

In one example, the first and second networks are each trained using different true and false training examples. For example, training examples used for the first network include parts of images from the first area of the image that include an occupant or part of an occupant and part of images of the first area of the image that don't include an occupant or parts of an occupant. The training examples for the second network include parts of images of the second area of the image that include an occupant or part of an occupant and part of images of the second area of the image that don't include an occupant or parts of an occupant.

In one embodiment an object which is a possible occupant is detected. A possible occupant may be determined to be a verified occupant based on the shape of the object and based on the location of the object in the image, as described herein. Upon detection of a verified occupant a signal may be generated, e.g., as described above.

In one embodiment an object is detected in an image by detecting motion in the image (e.g., by checking a series of images which includes this image). In some embodiments detecting the object in the image is dependent on the motion fulfilling predetermined criteria, for example, the motion must have predetermined characteristics.

Figure 3A:
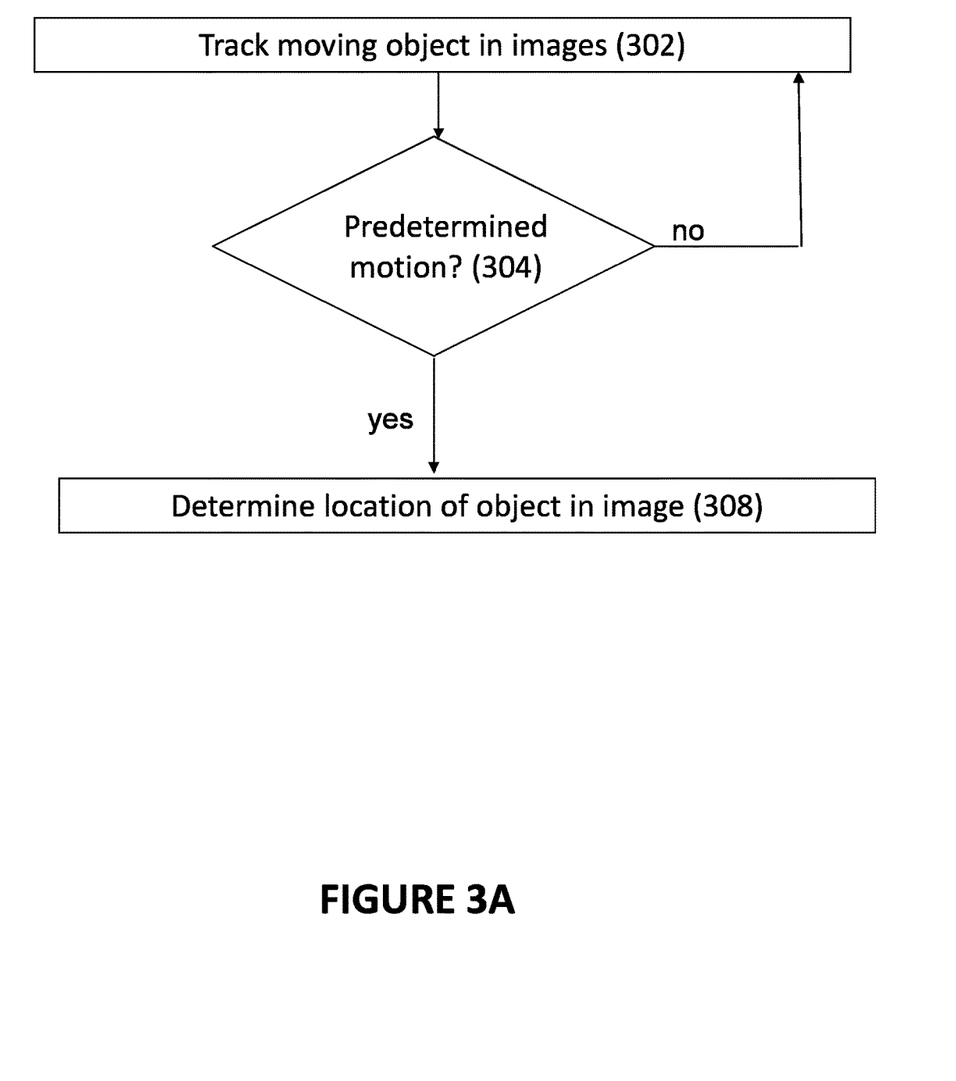
FIGS. 3A, 3B and 3C are schematic illustrations of methods for detecting in an image an object that is an occupant, according to embodiments of the invention.

In an example of this embodiment, which is schematically illustrated in FIG. 3A, a method for detecting an occupant in an image includes tracking a moving object in images of the space (302), e.g., images obtained from image sensor 103. If the motion of the tracked object is a predetermined motion (304) or a motion having predetermined characteristics, for example, coherent motion or a non-repetitive motion (which typically characterize a person's movement), then the location of the object in one of the images is determined (308) for further determination of the object's shape. If the motion is not the predetermined motion (304) the object may be further tracked or a new object may be tracked.

In some embodiments detecting the object in the image is dependent on the object fulfilling predetermined size and/or shape criteria.

Figure 3B:
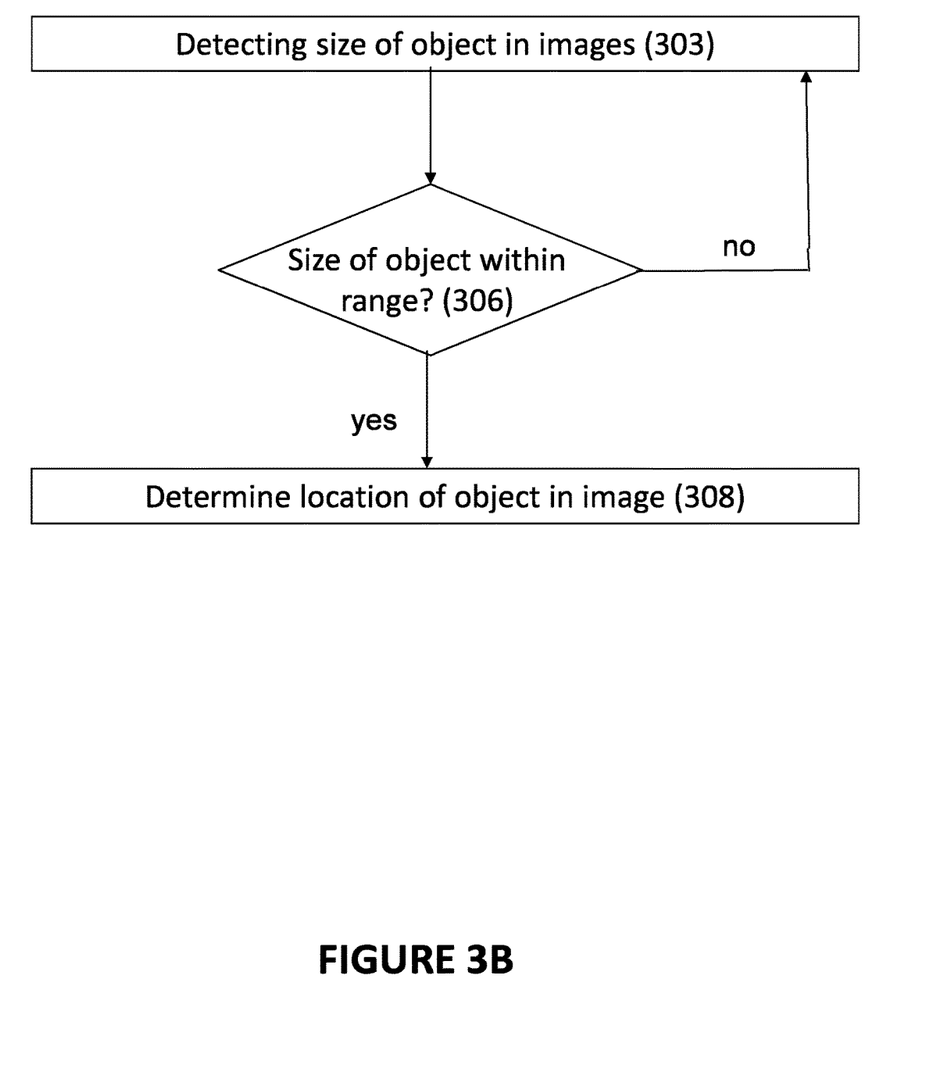

For example, as schematically illustrated in FIG. 3B, a method for detecting an occupant in an image includes detecting the size (and/or shape) of an object in an image (303), e.g., image obtained from image sensor 103. If the size of the object is within a predetermined range (306) (e.g., not smaller or larger than expected of a human form dependent on the field of view of the camera, the distance of the camera from the object and other such parameters) and/or the shape of the object fulfills predetermined criteria, then the location of the object in that image is determined (308) and the final or accurate shape of the object in that image may be determined based on the location of the object in the image, as detailed herein. If the object does not fulfill predetermined criteria and/or the size of the object is not within the predetermined range (306) the object may be further tracked or a new object may be tracked.

Figure 3C:
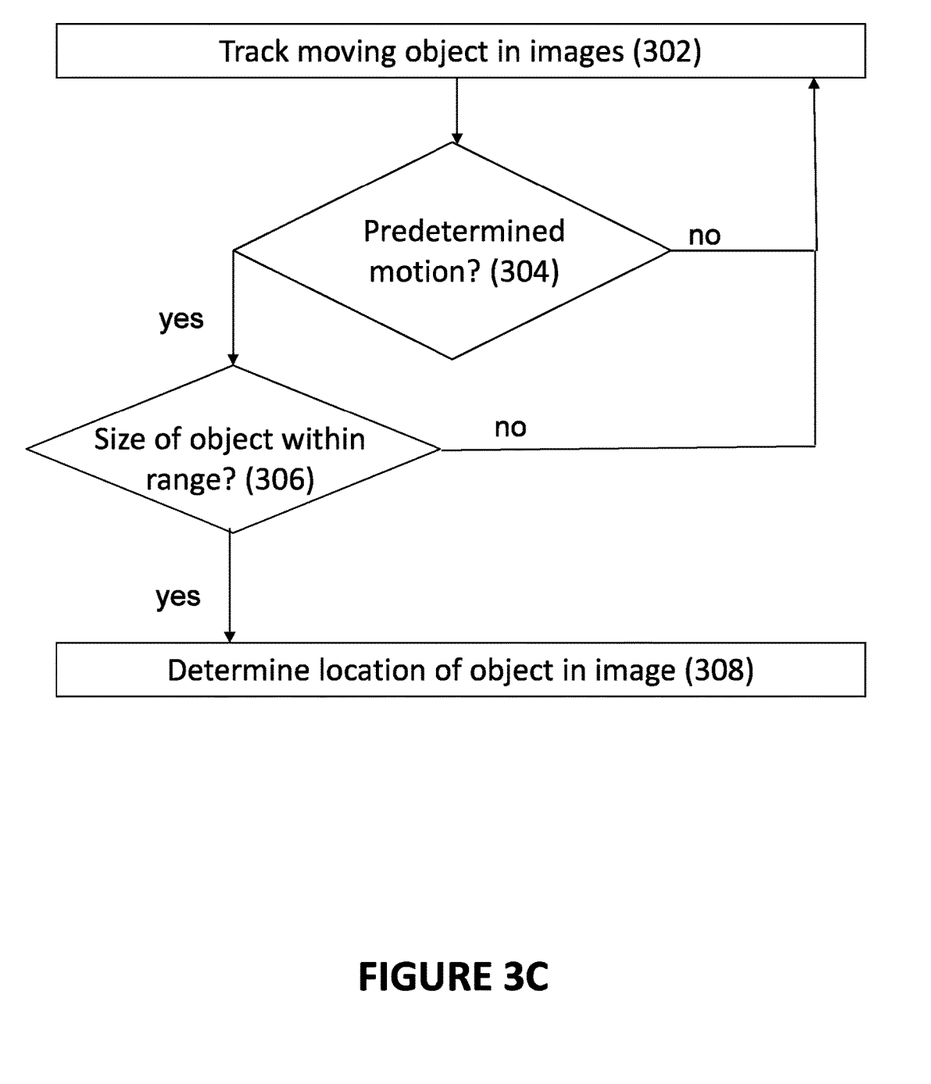

Optionally, as schematically illustrated in FIG. 3C, a method for detecting an occupant in an image includes tracking a moving object in images of the space (302). If the motion of the object fulfills predetermined criteria (304) an initial shape and/or size of the object in one of the images may be determined. If the determined initial shape fulfills predetermined criteria and/or the size of the object is within a predetermined range (306) (e.g., as described with reference to FIG. 3B), then the location of the object in that image is determined (308) and the final or accurate shape of the object in that image may be determined based on the location of the object in the image, as detailed herein. If the object does not fulfill predetermined criteria and/or the size of the object is not within the predetermined range (306) the object may be further tracked or a new object may be tracked.

An object may be determined to be an occupant based on the location of the object in the image, for example, as described with reference to FIGS. 2A and 2B or based on a determination of an initial shape and/or size and/or motion, for example, as described with reference to FIG. 3A, 3B or 3C.

Thus, one embodiment of the invention includes determining if an object is a possible occupant (for example, based on one or a combination of motion characteristics, initial shape and size of the object as detected from images of the space). If the object is a possible occupant then the shape of the object (or the final shape of the object) is determined based on a shape feature of the object, the shape feature being dependent on the location of the object in the image. In this embodiment, a verified occupant is determined based on the final shape of the object.

Figure 4:
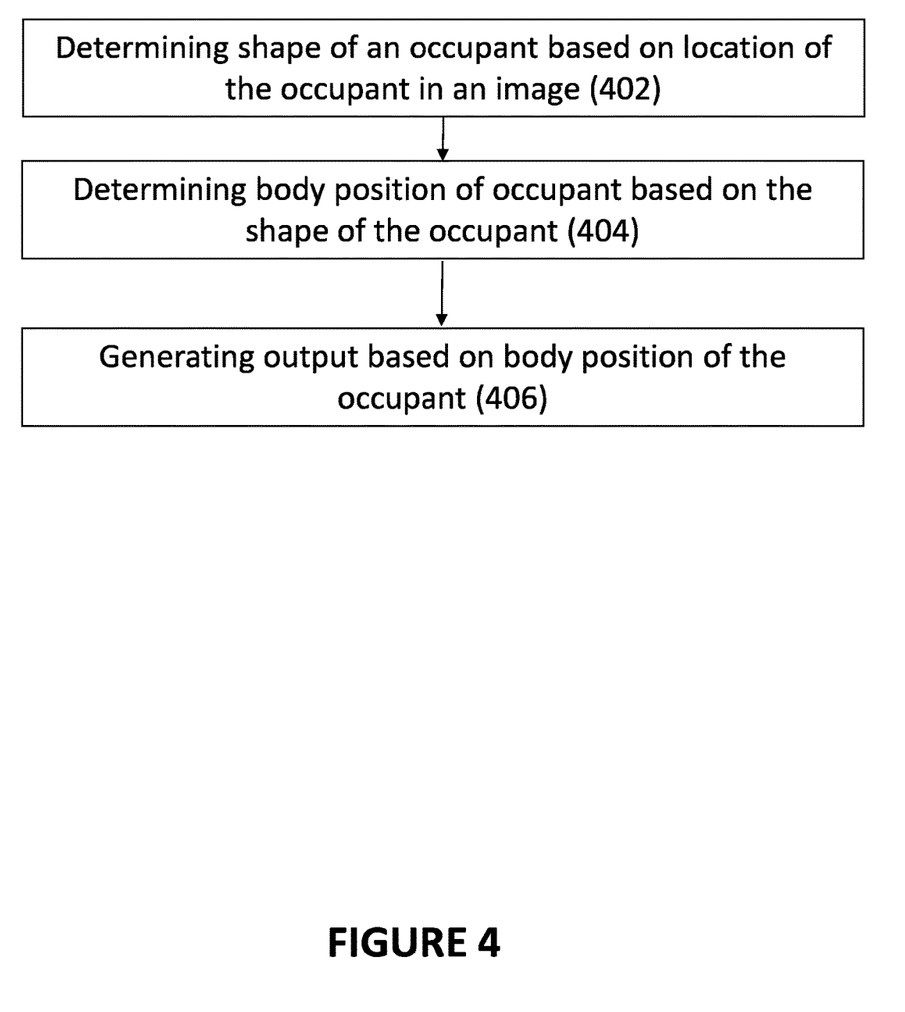
FIG. 4 is a schematic illustration of a method for determining a body position of an occupant, according to an embodiment of the invention.

In one embodiment, which is schematically illustrated in FIG. 4, once an object is determined to be an occupant, the shape of the occupant is determined based on the location of the occupant in an image (402), e.g., as detailed herein. The body position of the occupant (e.g., standing, sitting, squatting, lying, etc.) is then determined based on the shape of the occupant (404) and an output may be generated based on the body position of the occupant (406). For example, if the occupant is lying this may indicate a falling accident and an appropriate alarm may be generated.

Thus, in one embodiment there is provided a method for determining a body position of an occupant. In this embodiment, which is exemplified in FIG. 4, the body position of the occupant is detected by using a shape feature of the object, the shape feature being dependent on the location of the object in the image. In one embodiment, if the occupant is detected in a first area of the image, the body position of the occupant is determined based on a first shape feature of the occupant and/or by using a first network. If the occupant is detected in a second area of the image, the body position of the occupant is determined based on a second (different) shape feature of the occupant and/or by using a second (different) network. An output may be generated based on the determined body position of the occupant.

The different areas of an image may be the same size and/or shape or may be of different dimensions and/or shapes. For example, a first area of the image may be of a first shape (e.g., circular or rectangular) and the second area may be of a second shape (e.g., rectangular or circular).

In one embodiment a first area of the image includes a periphery of the image (e.g., periphery part 109 in FIG. 1) and the second area of the image includes a center of the image (e.g., center part 107 in FIG. 1).

The center of the image may be calculated as a function of dimensions of the image. For example, in one embodiment, the center of the image may be a circular shaped area having a radius that is proportional to the height of the image frame. For example, one area may include a circle in the center of the image frame, having a radius that is 70% of the height of that image frame and another area may include the rest of the frame. In some embodiments dimensions of the first area of the image and second area of the image may be dependent on parameters external to the image frame dimensions. For example, the different areas may be calculated based on the field of view of the camera which includes the image sensor obtaining the images. For example, one area may be calculated (e.g., by processor 102) as a percentage of the angle that defines the field of view of the camera.

Methods and systems according to embodiments of the invention overcome problems caused by distortions typical of top view images, thus enabling accurate and facilitated occupancy detection in top view images.

What is claimed is:

1. A method for controlling a device based on a shape of an object in an image, the method comprising:
    using a processor to
        calculate at least a first area of the image and a second area which comprises the rest of the area of the image, the first and second areas being of unequal sizes;
        detect the object in the image;
        if the object is detected in the first area of the image, determine a shape of the object based on a first shape feature of the object;
        if the object is detected in the second area of the image, determine the shape of the object based on a second shape feature of the object; and
        generate an output to control the device based on the determined shape of the object.

2. The method of claim 1 comprising:
    using a first network to determine the shape of the object if the object is detected in the first area of the image; and
    using a second network to determine the shape of the object if the object is detected in the second area of the image.

3. The method of claim 1 comprising detecting the object in the image by detecting motion in the image.

4. The method of claim 3 wherein the motion has predetermined characteristics.

5. The method of claim 1 comprising detecting the object in the image based on a size of the object.

6. The method of claim 1 comprising detecting the object in the image based on an initial shape of the object.

7. The method of claim 1 wherein the first area of the image comprises a periphery of the image and wherein the second area of the image comprises a center of the image.

8. The method of claim 7 wherein the center of the image is calculated as a function of dimensions of the image.

9. The method of claim 7 wherein the center of the image is calculated as a function of a field of view of a camera obtaining the image.

10. The method of claim 1 wherein the first area is of a first shape and the second area is of a second shape.

11. The method of claim 1 comprising:
    determining whether an occupant is sitting based on the shape of the object; and
    generating the output based on whether the occupant is sitting.

12. The method of claim 1 wherein the image is a top view image of a space.

13. A method comprising:
    using a processor to
        calculate all of an image into a plurality of areas -having different dimensions;
        determine the area of the image in which an object is located,
        determine a shape of the object using a network, the network being dependent on the area of the object in the image, and
        output a signal to control a device based on the determined shape of the object.

14. The method of claim 13 comprising:
    using the processor for
        determining if the object is a possible occupant, and
        if the object is a possible occupant then determining the shape of the object based on the network.

15. The method of claim 14 wherein the determining if the object is a possible occupant is based on one or a combination of motion characteristics, initial shape and size.

16. A system for detecting occupancy, the system comprising:
    a processor configured to
        calculate all of an image into a plurality of areas having different dimensions;
        determine the area of the image in which an object is located;

determine a shape of the object using a network, the network being dependent on the area of the image in which the object is located; and output a signal to control a device, based on the determination of the shape of the object.

17. The system of claim 16 wherein the image is a top view image of a space and the system comprising an image sensor configured to obtain the top view image of the space.

18. The system of claim 17 wherein the processor is embedded within the image sensor.

19. The system of claim 16 wherein the device comprises another processor, an alarm or an environment comfort device.

* * * * *